United States Patent [19]

Verrall et al.

[11] Patent Number: 5,607,620
[45] Date of Patent: Mar. 4, 1997

[54] LIQUID CRYSTAL POLYMERS

[75] Inventors: Mark A. Verrall; David Coates, both of Poole, United Kingdom

[73] Assignee: The Secretary of State for Defence in her Britannic Majesty's Government of the United Kingdom of Great Britain and Northern Ireland of Defence Research Agency, United Kingdom

[21] Appl. No.: 347,371

[22] PCT Filed: May 19, 1993

[86] PCT No.: PCT/GB93/01018

§ 371 Date: Dec. 6, 1994

§ 102(e) Date: Dec. 6, 1994

[87] PCT Pub. No.: WO93/25634

PCT Pub. Date: Dec. 23, 1993

[30] Foreign Application Priority Data

Jun. 5, 1992 [GB] United Kingdom .................... 9212012

[51] Int. Cl.$^6$ .......................... C09K 19/34; C09K 19/20; C08F 22/10
[52] U.S. Cl. ................. 252/299.67; 252/299.01; 252/299.63; 526/320; 526/321
[58] Field of Search .................. 252/299.01, 299.63, 252/299.67; 526/319, 320, 321

[56] References Cited

U.S. PATENT DOCUMENTS 4,966,726 10/1990 Scherowsky et al. ............... 252/299.6

OTHER PUBLICATIONS

V. P. Shibaev, "thermotropic liquid–crystalline polymers of the smectii and nemteic types with cyanobiphenyl groups in the side–claims", European polymer Journal. vol. 18, pp. 651–659, 1982.

P. Keller, "Synthesis of liquid crystalline side–chain polymers via phase–transfer catalyst", Mol. cryst. and liq. cryst. vol. 155, pp. 37–45, 1988.

CA:119:250750 Abstract only.

Primary Examiner—Shean C. Wu
Attorney, Agent, or Firm—Nixon & Vanderhye

[57] ABSTRACT

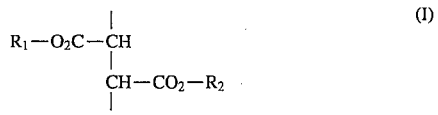

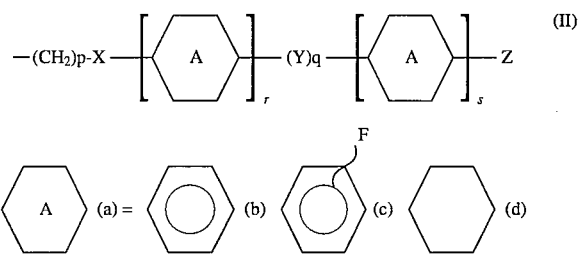

A novel LCP material based on fumarate and maleate di-esters is disclosed having general formula (I); $R_1$ and $R_2$ may may not be the same but have general structure (II); (a)=(b), (c), (d); p=2 to 14; q=0 or 1; r=1 or 2; s=1 or 2; X=O, $CO_2$, $O_2C$, $CH_2$; Y=$C_2H_4$, O, $CO_2$, $O_2C$; Z=CN, halogen, R, $CO_2R$, OR, $O_2CR$, wherein R=chiral or achiral.

3 Claims, No Drawings

LIQUID CRYSTAL POLYMERS

This application is a 371 of PCT/GB93/01018 filed May 19, 1993.

This invention concerns novel liquid crystal polymer (LCP) materials and method for preparing same.

BACKGROUND OF THE INVENTION

LCP's are known and are used in the electro-optical device industry, for example, in optical storage devices, in non-linear optical devices and in pyroelectric devices, see for example, GB 2146787 A and Makromol Chem, 186 2639–2647, 1985.

One known type of LCP consists of a polymeric backbone to which are attached pendant side chains which have a chemical structure than is mesogenic, ie. that induces liquid crystalline character, these being known as side chain liquid crystal polymers. Work in this field has identified a large number of side chain structures which are suitable, see for example GB 2146787 A. For some purposes it is desirable that the LCP shows a smectic C (Sc) or chiral smectic C (Sc*) liquid crystal phase, and a particularly preferred side chain for acheiving this is one which contains a laterally fluorinated biphenyl or terphenyl system.

Liquid crystal polyacrylates are known, Polymer Communications, 24, 364–365, 1988, having a polyacrylate backbone, eg. polymethacrylate, with pendent side chains, ie. of general structure:

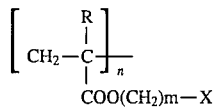

Where $(CH_2)m-X$ is the side chain and R is hydrogen or alkyl in the case of polyalkylacylates, being methyl in polymethacrylates.

DESCRIPTION OF THE INVENTION

According to the present invention there is provided a novel LCP material based on fumarate and maleate all-esters having improved liquid crystal properties over known LCP's, having a general formula I;

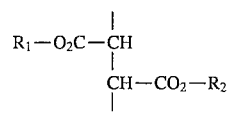

$R_1$ and $R_2$ may or may not be the same but have the following general structure:

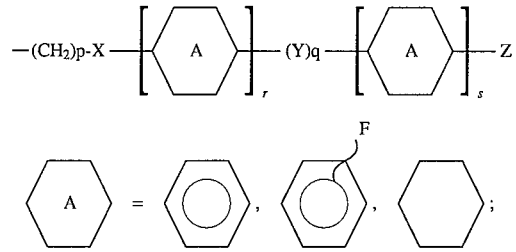

p=2 to 14;
q=0 or 1;
r=1 or 2;
s=1 or 2;
X=O, $CO_2$, $O_2C$, $CH_2$;
Y=$C_2H_4$, O, $CO_2$, $O_2C$;
Z=CN, halogen, R, $CO_2R$, OR, $O_2CR$, wherein R=chiral or achiral;
provided that when Z=alkoxy then q=0.

DESCRIPTION OF THE PREFERRED EMBODIMENTS

The general met,hod of preparation of LCP's of formula I is by polymerisation of a compound of general structure:

$$R_1-O_2C-CH=CH-CO_2-R_2$$

Wherein $R_1$ and $R_2$ have the general structure defined above.

EXAMPLE 1

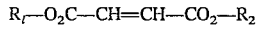

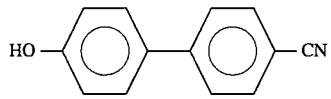

↓ Step 1

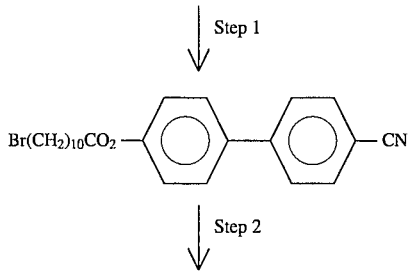

↓ Step 2

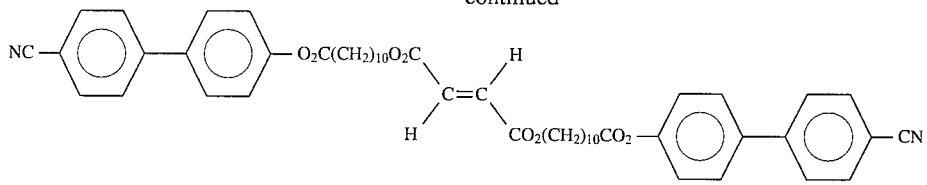

↓ Step 3

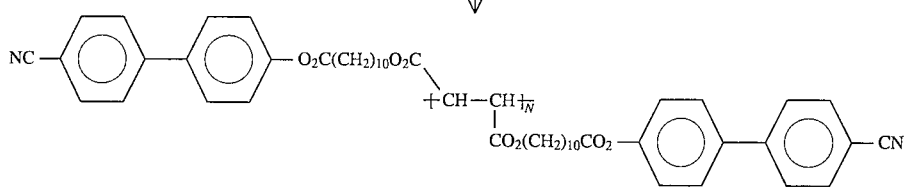

Step 1
4-hydroxy-4'cyanobiphenyl was stirred at room temperature with 11-bromo-1-undecanoic acid and trifluoroacetic acid in dichloromethane for 24 hours. The product was purified by recrystallisation from IMS.

Step 2
The product from step 1 was stirred at room temperature with fumaric acid and sodium hydride in hexamethyl phosphoramide for 18 hours, The solution was acidified and separated in ether/water, The product was purified by recrystallisation from IMS.

Step 3
The monomer was then stirred at 50°–80° C. in a little 1,2-dichloroethane with azoisobutyronitrile as the initiator for 24 hours. The polymer was separated by reprecipitation from DCM/IMS.

It will be appreciated that it is not intended to limit the invention to the above example only, many variations, such as might readily occur to one skilled in the art, being possible, without departing from scope thereof as defined in the appended claims.

We claim:

1. A liquid crystal polymer having the formula I:

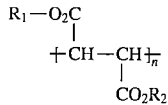

where n is the number of repeat units and $R_1$, and $R_2$ which may be the same or different, have the structure:

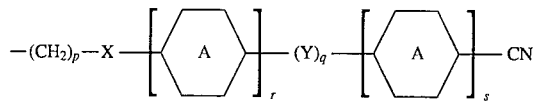

where

A is independently selected from phenyl, fluorophenyl or cyclohexyl;

p is 2 to 14, q is 0 or 1, r is 1 or 2, s is 1 or 2,

X is O, $CO_2$ or $O_2C$ or $CH_2$, and

Y is $C_2H_4$, O, $CO_2$ or $O_2C$.

2. A liquid crystal polymer of the formula

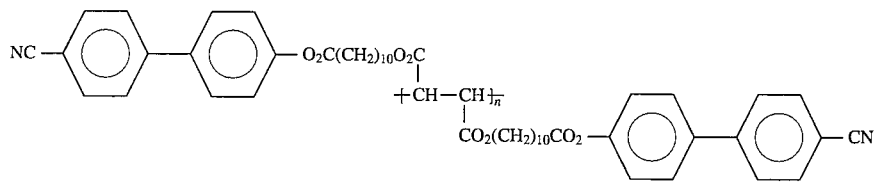

wherein n is the number of repeat units in the polymer.

3. A method of synthesis of a compound of the formula:

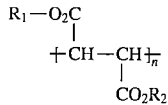

where n is the number of repeat units and $R_1$ and $R_2$, which may be the same or different, have the structure:

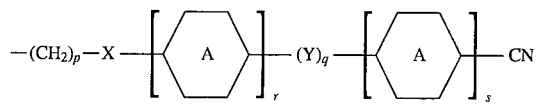

where

A is independently selected from phenyl, fluorophenyl or cyclohexyl;

p is 2 to 14, q is 0 or 1, r is 1 or 2,
s is 1 or 2,
X is O, $CO_2$ or $O_2C\ CH_2$, and
Y is $C_2H_4$, O, $CO_2$ or $O_2C$ said process comprising polymerizing a compound of the formula $$R_1-O_2C-CH=CH-CO_2-R_2$$

wherein $R_1$ and $R_2$, which may be the same or different, have the structure given above.

* * * * *